United States Patent
Mullins et al.

(10) Patent No.: US 11,223,473 B2
(45) Date of Patent: Jan. 11, 2022

(54) CLIENT-DRIVEN SHARED SECRET UPDATES FOR CLIENT AUTHENTICATION

(71) Applicant: EMC IP Holding Company LLC, Hopkinton, MA (US)

(72) Inventors: Brian C. Mullins, Burlington, MA (US); Kevin Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 321 days.

(21) Appl. No.: 16/264,877

(22) Filed: Feb. 1, 2019

(65) Prior Publication Data

US 2020/0252212 A1 Aug. 6, 2020

(51) Int. Cl.
*H04L 29/06* (2006.01)
*H04L 9/08* (2006.01)
*H04L 9/32* (2006.01)

(52) U.S. Cl.
CPC ............ *H04L 9/0891* (2013.01); *H04L 9/085* (2013.01); *H04L 9/0838* (2013.01); *H04L 9/3226* (2013.01); *H04L 9/3228* (2013.01); *H04L 9/3297* (2013.01); *H04L 63/083* (2013.01)

(58) Field of Classification Search
None
See application file for complete search history.

(56) References Cited

U.S. PATENT DOCUMENTS

| | | |
|---|---|---|
| 8,904,482 B1 | 12/2014 | Dotan |
| 9,197,414 B1 | 11/2015 | Martin |
| 9,673,979 B1 | 6/2017 | Poole |
| 10,032,035 B2 | 7/2018 | Sinha et al. |
| 10,263,779 B2 | 4/2019 | Wu |
| 2005/0239440 A1* | 10/2005 | Chen .................. H04L 63/0853 455/411 |
| 2006/0236101 A1* | 10/2006 | Qiao .................. H04L 29/06027 713/168 |
| 2007/0288327 A1 | 12/2007 | Pulnikova |
| 2010/0042838 A1* | 2/2010 | Ho ....................... H04L 9/0844 713/169 |
| 2010/0058072 A1 | 3/2010 | Teow |
| 2010/0253470 A1 | 10/2010 | Burke |
| 2013/0024918 A1 | 1/2013 | Cramer |

(Continued)

*Primary Examiner* — Andrew J Steinle

(74) *Attorney, Agent, or Firm* — Ryan, Mason & Lewis, LLP

(57) ABSTRACT

Techniques are provided for client-driven shared secret updates for client authentication. One method comprises, in response to a first authentication of a client by a server using a given shared secret, updating, by the client, the given shared secret to generate an updated shared secret and storing the updated shared secret with the server; and submitting the updated shared secret to the server as part of a second authentication of the client. The updating is optionally performed by one or more of a password vault and a browser extension. The client may randomly select the updated shared secret or compute the updated shared secret in a predefined manner. The server may evaluate whether the client stores the updated shared secret with the server in connection with the first authentication and implement one or more predefined steps when the updated shared secret is not stored with the server.

20 Claims, 8 Drawing Sheets

(56) References Cited

U.S. PATENT DOCUMENTS

| | | | |
|---|---|---|---|
| 2013/0024947 A1* | 1/2013 | Holland | G06F 21/60 |
| | | | 726/28 |
| 2013/0124292 A1 | 5/2013 | Juthani | |
| 2013/0191889 A1 | 7/2013 | Eldefrawy | |
| 2014/0052995 A1 | 2/2014 | Hu | |
| 2014/0057599 A1 | 2/2014 | Hazari | |
| 2014/0109727 A1 | 4/2014 | Long | |
| 2014/0298432 A1* | 10/2014 | Brown | H04L 63/0853 |
| | | | 726/6 |
| 2015/0081832 A1 | 3/2015 | Handa | |
| 2015/0188913 A1 | 7/2015 | Teixeron | |
| 2016/0330623 A1 | 11/2016 | Koriyama | |
| 2016/0337124 A1 | 11/2016 | Rozman | |
| 2016/0373430 A1 | 12/2016 | Bhat | |
| 2017/0032111 A1 | 2/2017 | Johansson | |
| 2017/0064546 A1 | 3/2017 | Baligh | |
| 2017/0139778 A1* | 5/2017 | Kito | G06F 8/66 |
| 2018/0121921 A1 | 5/2018 | Woo | |
| 2018/0248862 A1 | 8/2018 | Farrell | |
| 2018/0255458 A1 | 9/2018 | Villar | |
| 2019/0068366 A1 | 2/2019 | Guajardo Merchan | |
| 2019/0306153 A1* | 10/2019 | Girdhar | G06F 21/45 |

\* cited by examiner

CLIENT-DRIVEN SHARED SECRET UPDATES FOR CLIENT AUTHENTICATION

CROSS-REFERENCE TO RELATED APPLICATION(S)

The present application is related to U.S. patent application Ser. No. 16/264,925, entitled "Authentication Based on Shared Secret Seed Updates for One-Time Passcode Generation," (now U.S. Pat. No. 11,032,271); and U.S. patent application Ser. No. 16/264,897, entitled "Authentication Based on Shared Secret Updates," each filed contemporaneously herewith and incorporated by reference herein.

FIELD

The field relates generally to information processing systems, and more particularly to authentication techniques in such systems.

BACKGROUND

Many modern authentication solutions are based upon a client proving knowledge to a server of a shared secret value, such as a password, a personal identification number, or a symmetric key. Similarly, one-time passcode solutions leverage shared knowledge of a shared secret seed to perform time-based or counter-based computations by the client and the server to prove knowledge of the shared secret seed. While efficient, such shared secret cryptography techniques suffer from an inability to ensure that only one client shares a given shared secret with the server. The continued assumption that only the one client and the server have the shared secret cannot be verified.

A need therefore exists for improved techniques for protecting shared secrets.

SUMMARY

In one embodiment, a method comprises, in response to a first authentication of a client by a server using a given shared secret, updating, by the client, the given shared secret to generate an updated shared secret and storing the updated shared secret with the server; and submitting the updated shared secret to the server as part of a second authentication of the client.

In some embodiments, the updating is performed by one or more of a password vault and a browser extension. The server may evaluate whether the client stores the updated shared secret with the server in connection with the first authentication and implement one or more predefined steps when the updated shared secret is not stored with the server. In at least one embodiment, the client randomly selects the updated shared secret.

Other illustrative embodiments include, without limitation, apparatus, systems, methods and computer program products comprising processor-readable storage media.

DETAILED DESCRIPTION

Figure 1:
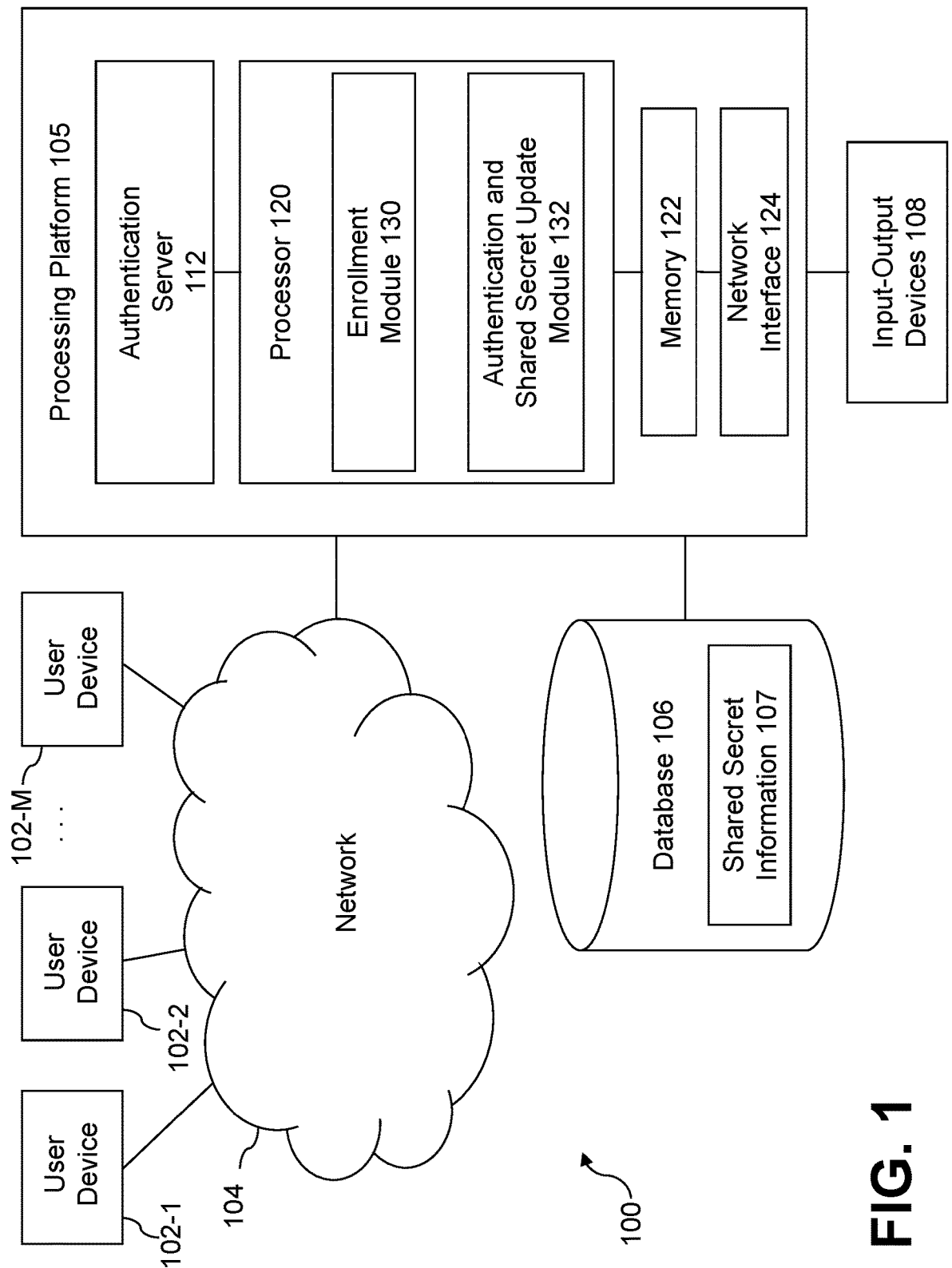
FIG. 1 shows an information processing system configured for performing authentication in one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for client-driven shared secret updates for client authentication.

In one or more embodiments, techniques are provided for client-driven shared secret evolution that leverage previous communications between two parties to evolve the shared secret in a known way. In some embodiments, if the shared secret is used by a third party without the knowledge of the client, upon future communication with the client, the server can detect an inconsistency indicating the use of the shared secret by the third party. Remediation actions can then be implemented to establish a new shared secret known only by the client and server.

One challenge in shared secret authentication is ensuring that the shared secret remains unknown to other parties. Existing attempts to protect the shared secret involve, for example, dedicated secure hardware, layered encryption, password vaults, and other techniques. However, the core assumption of these authentication systems is that the shared secret is only known to the client and server. These secrets are often valid for a long period of time and breaking the assumption of secrecy can lead to significant adverse consequences.

Moreover, if an attacker can intercept the channel between the client and the server, an opportunity exists for a Man-in-the-Middle (MITM) attack, whereby the attacker accesses the transmission from the client to the server to obtain the shared secret then the attacker uses the one-time passcode (OTP) to authenticate as the client (or a user of the client). While this can be overcome under some circumstances, the disclosed solution also provides a detection capability for such an attack.

In one or more embodiments, the disclosed client-driven shared secret evolution techniques update the shared secret of a user (or corresponding client) to create a chain of shared secrets. This shared secret evolution is driven by use of the current shared secret. When a given shared secret is used for authentication, the given shared secret is updated based on some aspect of the authentication to create a new shared secret, as discussed hereinafter. As both the client and server observe the successful authentication, in some embodiments, they can both update their copy of the shared secret, creating a chain of shared secret values. In this manner, should the shared secret be compromised, the server can observe an inconsistency in authentication attempts that would indicate that the shared secret information is being leveraged by multiple clients, as discussed further below. Generally, the server can detect and respond to cloning and other attacks or anomalies, such as MITM attacks. In some situations, the authentication server may not know which authentication attempt was invalid. It may be unknown, for example, whether the current user is a legitimate user or an "attacker." Moreover, there could be situations where an alert would be raised that is not actually an attack, but represents an anomaly. In the case of client-driven shared secret updates, especially if there is network disruption between the client and server, an update sent by the client to the authentication server for storage may not be received by the authentication server (which is not necessarily an attack, but rather may be considered an anomaly).

One or more embodiments of the disclosure recognize that the disclosed client-driven shared secret evolution techniques can leverage a password vault and/or a browser extension to perform a password change against the server, as would be apparent to a person of ordinary skill in the art. Each time a user is authenticated, the password vault (and/or browser extension) generates a new shared secret and changes the shared secret at the server with the newly computed shared secret. In this case, the shared secret update is a one-sided operation performed by the client device. The client generates a new shared secret and notifies the server of the updated shared secret value. Among other benefits, the server can decouple authentication from shared secret updates (servers currently perform these functions today), In addition, the disclosed client-driven shared secret update techniques for client authentication optionally leverage the pattern of one expected action following another expected action to detect potential attackers, as discussed hereinafter. If a user always changes their shared secret upon a login and does not do so for a new login attempt, the server can observe this behavior and respond appropriately (e.g., forcing a step-up authentication). If an attacker, knowing this is the policy, changes the shared secret, the new shared secret would be unknown to the legitimate user. Thus, at the next login attempt by the user, the shared secret would fail, and the user would be made aware of an issue (e.g., a potential compromise of the shared secret). Server logic and/or a policy can ensure that the shared secret was not changed twice to bypass this detection (e.g., once to a new value, and then back to the original shared secret so the valid user login would occur correctly).

In some embodiments, the shared secret is modified by a client device after a successful authentication attempt by using information from the authentication as part of a shared secret update protocol to generate an updated shared secret. The information from the authentication comprises, for example, a timestamp of the authentication, a random value used in the authentication, and a substantially unique value used in the authentication. By incorporating this information from the authentication into the updated shared secret, and thus, the next authentication attempt, an authentication chain is created (in a similar manner as blocks in a blockchain containing pointers to previous blocks).

FIG. 1 shows a computer network 100 configured in accordance with an illustrative embodiment of the disclosure. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a processing platform 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The processing platform 105 has an associated database 106 configured to store shared secret information 107 that optionally includes each shared secret used for authentication by a user and a corresponding timestamp when a given shared secret was used, as discussed further below.

As discussed further below in conjunction with FIGS. 5 and 6, in order to detect inconsistencies in an authentication chain of shared secrets, the server can optionally store some additional data as part of the shared secret information 107, beyond a current shared secret value. In various embodiments, the stored additional data varies, depending on what the client sends to the server as part of an authentication attempt. For example, the server can store the timestamp of the authentication when a particular shared secret was used. Assuming that the client and the server can agree on the time of an authentication (for example, within some predefined tolerance), the client and the server can both use that information to update their secrets appropriately.

In some embodiments, the timestamp is not needed. In such embodiments, reused secrets are detected by checking if the supplied authentication information is correct for any previous secret. This approach may be impractical due to performance reasons (e.g., having to search a large number of previously submitted secrets for prior authentication attempts of a given user). Thus, storing the timestamp along with the previously submitted secrets allows the server to efficiently detect reused secrets, with the assumption that the client provides the timestamp of the last known successful authentication (from the view of the client) when submitting a current authentication.

The database 106 in the present embodiment is implemented using one or more storage systems associated with the processing platform 105. Such storage systems can comprise any of a variety of different types of storage including, for example, network-attached storage (NAS), storage area networks (SANs), direct-attached storage (DAS) and distributed DAS, as well as combinations of these and other storage types, including software-defined storage.

Also associated with processing platform 105 are input-output devices 108, which illustratively comprise keyboards, displays or other types of input-output devices in any combination. Such input-output devices are used to support one or more user interfaces to the processing platform 105, as well as to support communication between the processing platform 105 and other related systems and devices not explicitly shown.

Figure 2:
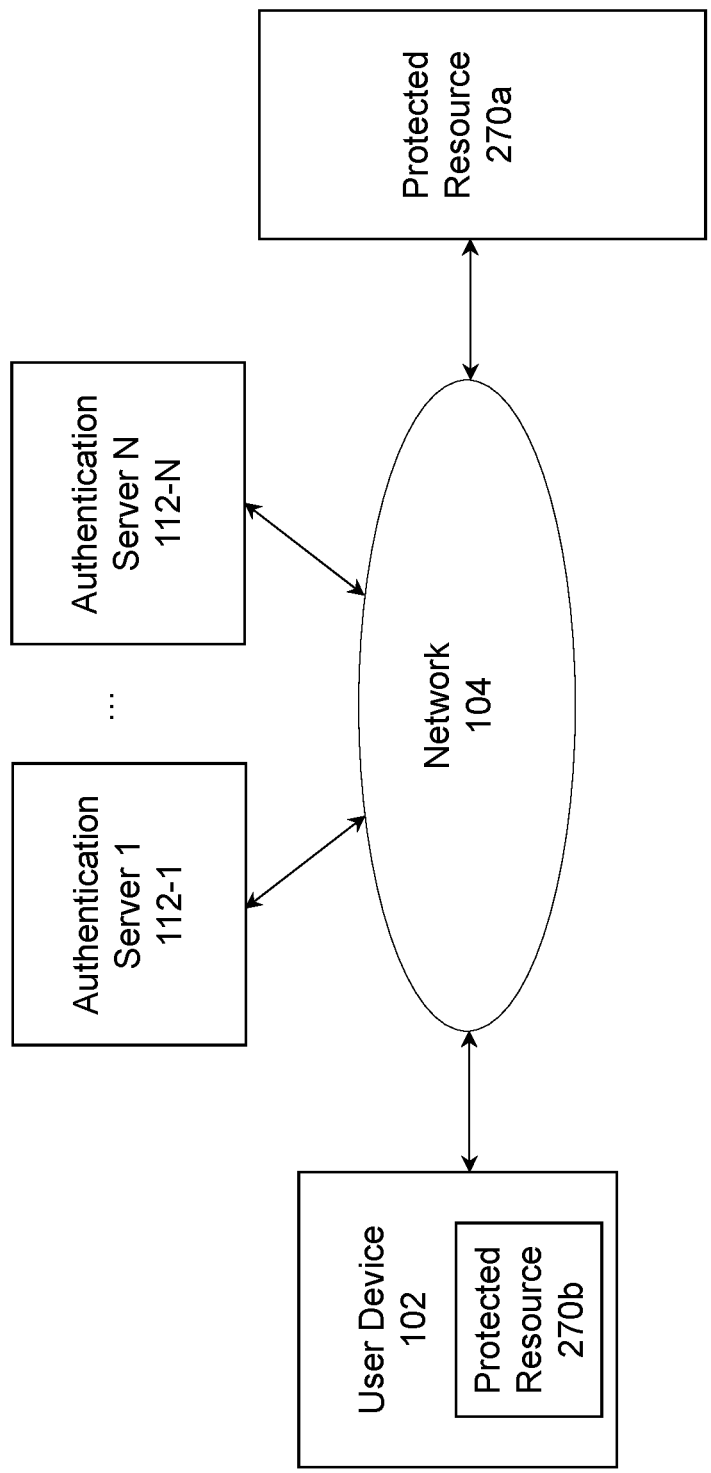
FIG. 2 shows another information processing system configured for performing authentication in at least one embodiment of the disclosure.

In one or more embodiments of the disclosure (such as the example embodiment depicted in FIG. 1), the processing platform 105 comprises an authentication server 112. Authentication events, such as an evaluation of a shared secret submitted by a user, initiated at respective ones of the user devices 102, are directed to the authentication server 112 over the network 104 for processing. The authentication server 112 can determine if a given access attempt is authentic, based on an evaluation of the responsive shared secret from the user submitted in response to a challenge. Upon verification of the presented authentication factors, the authentication server 112 grants the requesting user device 102 access to one or more protected resources of the computer network 100 (such as further depicted in FIG. 2, for example). Although shown as an element of the processing platform 105 in this embodiment, the authentication server 112 in other embodiments (such as depicted in FIG. 2, for example) can be implemented at least in part externally to the processing platform 105, for example, as a stand-alone server, set of servers or other type of authentication system coupled to the network 104.

The processing platform 105 in the FIG. 1 embodiment is assumed to be implemented using at least one processing device. Each such processing device generally comprises at least one processor and an associated memory, and implements one or more functional modules for controlling certain features of the processing platform 105.

More particularly, the processing platform 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the disclosure include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the processing platform 105 to communicate over the network 104 with the user devices 102, and illustratively comprises one or more conventional transceivers.

The processor 120 further comprises an enrollment module 130 and an authentication and shared secret update module 132.

It is to be appreciated that this particular arrangement of modules 130 and 132 illustrated in the processor 120 of the FIG. 1 embodiment is presented by way of example only, and alternative arrangements can be used in other embodiments. For example, the functionality associated with the modules 130 and 132 in other embodiments can be distributed across multiple processing nodes, or separated across a larger number of modules within processor 120. As another example, multiple distinct processors can be used to implement different ones of the modules 130 and 132 or portions thereof.

At least portions of the enrollment module 130 and/or authentication and shared secret update module 132 may be implemented at least in part in the form of software that is stored in memory 122 and executed by processor 120. Similarly, at least portions of the authentication server 112 of the processing platform 105 can be implemented at least in part in the form of software that is stored in memory 122 and executed by processor 120.

It is to be understood that the particular set of elements shown in FIG. 1 for authentication of a user in authentication processes involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the processing platform 105 can be eliminated and associated elements such as authentication server 112, enrollment module 130 and/or authentication and shared secret update module 132 can be implemented elsewhere in the computer network 100.

An exemplary process utilizing authentication and shared secret update module 132 of the processing platform 105 in computer network 100 will be described in more detail with reference to the flow diagram of FIG. 5.

FIG. 2 is a system diagram of an illustrative embodiment of the disclosure. By way of illustration, FIG. 2 depicts an alternative embodiment to FIG. 1, wherein the authentication server(s) 112 is/are not resident on the processing platform 105 or user device(s) 102, but rather are separate devices. Accordingly, as depicted in FIG. 2, user device 102 communicates with a protected resource 270a over network 104. As detailed further below, at least one embodiment of the disclosure can also include a user device 102 that includes a protected resource 270b residing thereon. In an example implementation, a user authenticates online with one or more authentication servers 112-1 through 112-N (hereinafter, collectively referred to as authentication servers 112) before obtaining access to protected resource 270a and/or 270b (hereinafter, collectively referred to as protected resource 270 unless otherwise specified).

According to one aspect of the disclosure, as noted above, the user of the user device 102 is authenticated by authentication servers 112 using a shared secret of the user, and/or other forms of cryptographic information. The exemplary communications among the system elements 102, 104 and 270 of FIG. 2 employed to achieve authentication by the authentication servers 112 are discussed further below.

It is to be appreciated that a given embodiment of the disclosed system may include multiple instances of user device 102 and protected resource 270, and possibly other system components, although only single instances of such components are shown in the simplified system diagram of FIG. 2 for clarity of illustration.

As noted herein, user device 102 may represent a portable device, such as a mobile telephone, personal digital assistant (PDA), wireless email device, game console, etc. The user device 102 may alternatively represent a desktop or laptop personal computer (PC), a microcomputer, a workstation, a mainframe computer, a wired telephone, a television set top box, or any other information processing device which can benefit from the use of authentication techniques in accordance with the disclosure.

The user device 102 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, biometric sample, OTP, or other cryptographic information described as being associated with a user may, for example, be associated with a user device 102, a person utilizing or otherwise associated with the device, or a combination of both the person and the device.

As also depicted in FIG. 2, the authentication servers 112 can be associated with a third party entity, such as an authentication authority, that processes authentication requests on behalf of web servers and other resources, as well as verifies the cryptographic information that is presented by a user device 102.

Further, the protected resource 270 may be, for example, an access-controlled application, data store, web site or hardware device. In other words, a protected resource 270 is a resource that grants user access responsive to an authentication process, as will be described in greater detail below. For example, protected resource 270a may include an access-controlled file, an e-mail, a protected application, a remote application server such as a web site or other software program or hardware device that is accessed by the user device 102 over a network 104.

Additionally, in at least one embodiment of the disclosure, protected resource 270b can include one or more applications or data residing on the user device 102 itself. For example, such a protected resource 270b can include access to a mobile data management container for launching applications on the user device 102 (such as a mobile device), which can be protected requiring authentication in order to run the application(s) protected by the container. Further, protected resource 270b could also include an access-controlled file, e-mail, protected application, remote application server such as a web site or other software program or hardware device that is accessed by the user device 102 over network 104. Similarly, it is possible that in order to unlock the mobile platform to perform operations, a successful authentication might be required.

Figure 3:
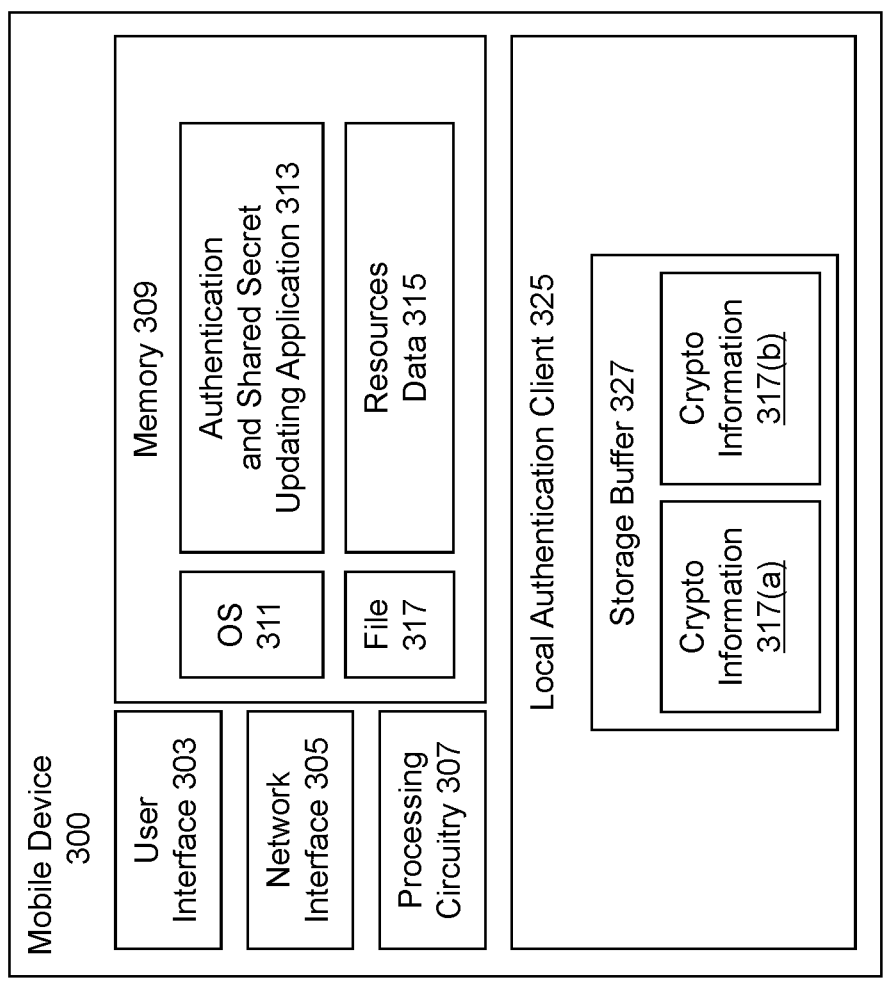
FIG. 3 is a system diagram of an exemplary mobile device on which at least one embodiment of the disclosure can be implemented.

FIG. 3 is a system diagram of an exemplary mobile device 300 on which at least one embodiment of the disclosure can be implemented. By way of illustration, as shown in FIG. 3, the exemplary mobile device 300 comprises a user interface 303 configured to receive user input and provide user output, such as a data file and/or data file location selection(s), such as described herein. One or more embodiments of the disclosure can include components such as a display screen, a capacitive touch display, and a push-button keyboard implemented for use in connection with the user interface 303.

Additionally, the mobile device 300 includes a network interface 305 configured to connect the mobile device 300 to a communications medium such as, for example, Wi-Fi and/or cellular telephony. Accordingly, the network interface 305 enables the mobile device 300 to communicate with the other components of an electronic environment.

The mobile device 300 further comprises a memory 309 configured to store one or more software constructs including, for example, an operating system 311, an authentication and shared secret updating application 313, data for protected resources 315 (e.g., documents and restricted applications), a cryptographic information file 317, as well as other suitable or relevant material.

In one or more embodiments, processing circuitry 307 of the mobile device 300 is configured to operate in accordance with the software constructs stored in the memory 309. By way of example, when the processing circuitry 307 runs the operating system 311, the processing circuitry 307 provides a secure electronic platform on which a user is able to carry out work. Such an electronic platform is capable of operating, for example, as a container to protect data requiring user authentication before permitting access. Further, when the processing circuitry 307 runs the authentication and shared secret updating application 313, the processing circuitry 307 communicates with a local authentication client 325 in a secure manner, for example, to obtain cryptographic information 317(a), 317(b) from a storage buffer 327 and with a server to update a shared secret stored by the server, as additionally described herein.

Additionally, for completeness, cellular phone circuitry within mobile device 300 allows the user to establish cellular phone calls with other callers having remote devices, as would be appreciated by one skilled in the art.

It should be appreciated that the processing circuitry 307 can include one or more processors running specialized software components, such as detailed in connection with the techniques detailed herein and further depicted in FIG. 4.

In at least one embodiment of the disclosure, once the mobile device 300 is able to obtain valid cryptographic information, the user of the mobile device 300 is able to perform local user authentication to access protected resources. Accordingly, as noted, the mobile device 300 is provisioned with the authentication and shared secret updating application 313 and cryptographic information file 317 holding cryptographic information to be used in connection with an authentication process. For example, and as further detailed herein, such cryptographic information within cryptographic information file 317 can include one or more shared secrets of the user in some embodiments.

Consequently, the processing circuitry 307 of the mobile device 300 can perform a local authentication operation using cryptographic information file 317 stored in the memory 309. In at least one embodiment of the disclosure, the processing circuitry 307 runs the authentication and shared secret updating application 313, which directs the user of the mobile device 300, via the user interface 303, to enter cryptographic information (such as, for example, shared secrets of the user) which is captured as one or more input elements 317(a), 317(b), etc. While the captured cryptographic information 317(a), 317(b), etc. is temporarily stored in the storage buffer 327 of the local authentication client 325, the authentication and shared secret updating application 313 evaluates the captured user-provided cryptographic information 317(a), 317(b), etc. using a shared secret of the user (e.g., provided during enrollment in file 317) to determine a likelihood of a match and/or plausibility of the user-provided cryptographic information. In addition, following the authentication, the authentication and shared secret updating application 313 stores an updated shared secret with the server.

If a match or otherwise positive resolution is determined via this evaluation, the authentication and shared secret updating application 313 permits the user to access a protected resource (such as, for example, data in association with element 315 that are stored in the memory 309).

Figure 4:
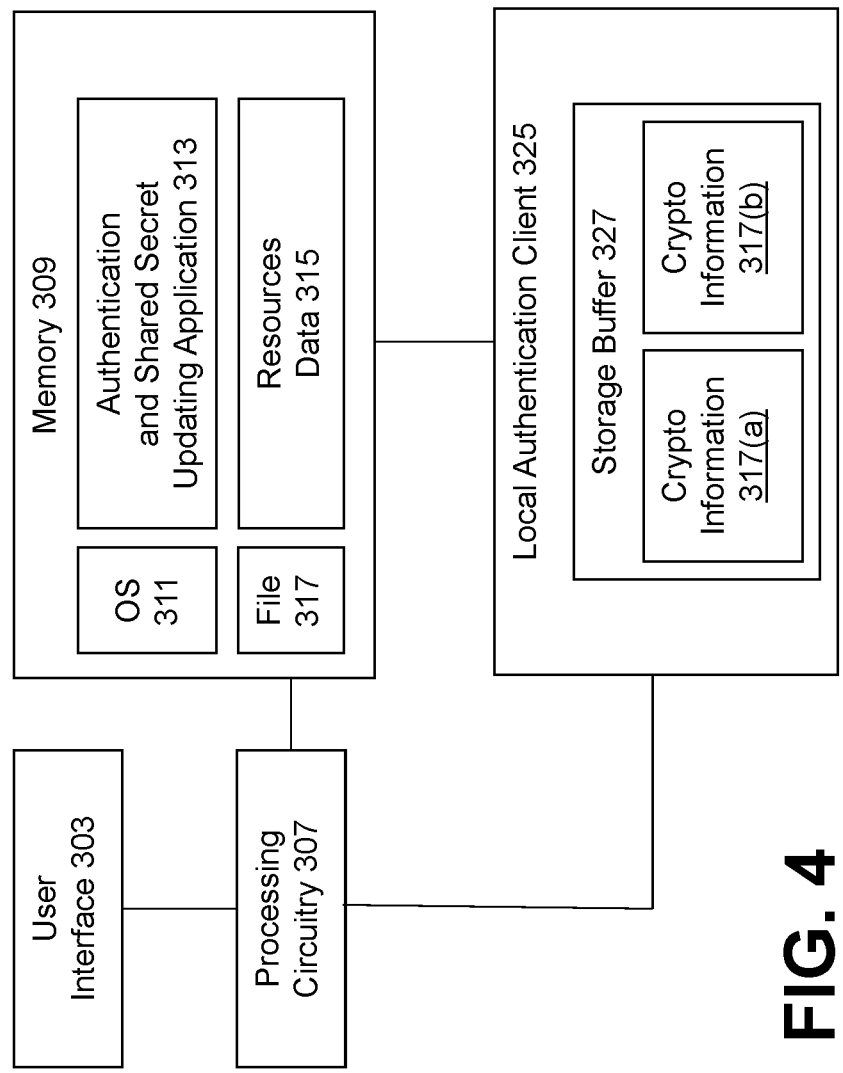
FIG. 4 is a system diagram of exemplary mobile device components, in accordance with one embodiment of the disclosure.

FIG. 4 is a system diagram of exemplary mobile device components, in accordance with at least one embodiment of the disclosure. As depicted in FIG. 4, a user can enter cryptographic information via user interface 303. This entered cryptographic information is captured as one or more input elements 317(a), 317(b). Such input elements can include, as noted above, the user-provided shared secret of the user.

Accordingly, the captured one or more input elements 317(a), 317(b), etc. can be stored in cryptographic information file 317 to be subsequently used in conjunction with fuzzy logic to carry out an authentication process.

Consequently, a corresponding cryptographic flow (carried out, for example, by authentication and shared secret updating application 313 as run by operating system 311) can take the following exemplary form. The user is prompted (via user interface 303) as part of a challenge to enter cryptographic information in connection with an authentication request to access a protected resource associated with the mobile device (for example, the user wishes to access and/or unlock his or her smart phone). The entered cryptographic information is captured by the processing circuitry 307 as one or more input elements 317(a), 317(b) that are temporarily stored in the storage buffer 327 of the local authentication client 325.

Subsequently, the authentication and shared secret updating application 313 evaluates the captured user-provided cryptographic information 317(a), 317(b), etc. with the original challenge in file 317 stored in memory 309 to determine a likelihood of a match and/or plausibility of the user-provided response(s). If the user-entered input elements 317(a), 317(b) are deemed to be matching and/or plausible, authentication is deemed successful and the user is granted access to the protected resource in question. In addition, following the authentication, the authentication and shared secret updating application 313 stores an updated shared secret with the server.

Figure 5:
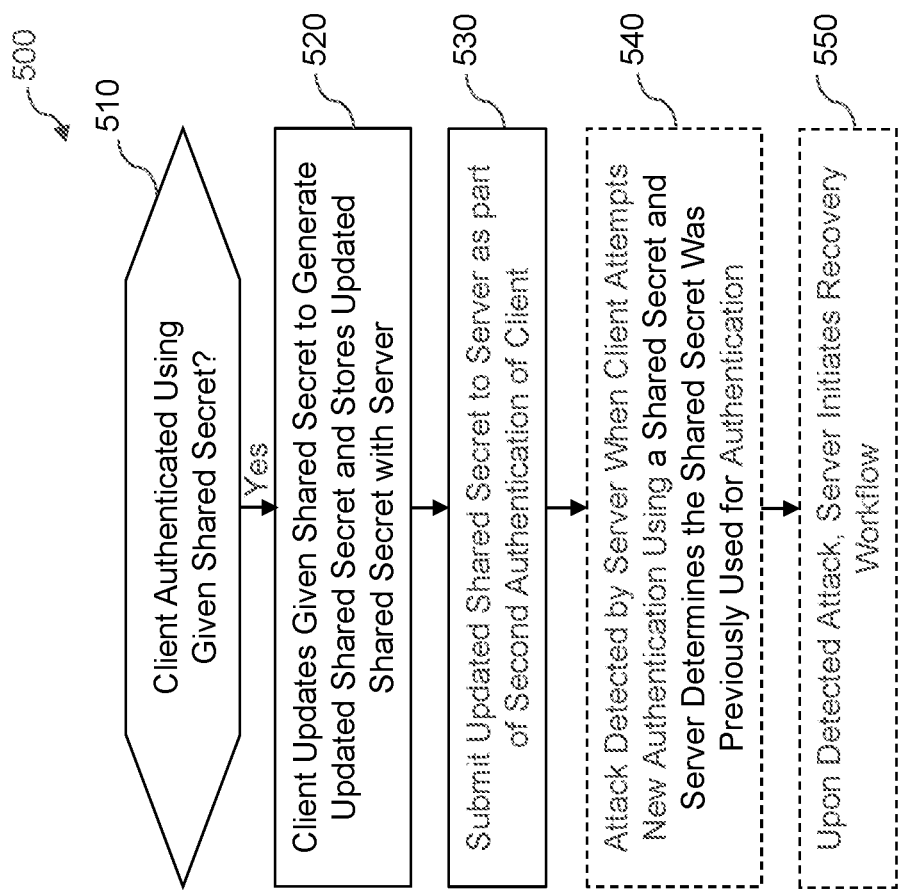
FIG. 5 is a flow diagram of a client-driven shared secret update process for client authentication, according to one illustrative embodiment of the disclosure.

FIG. 5 is a flow diagram of an exemplary client-driven shared secret update process for client authentication 500, according to one illustrative embodiment. As shown in FIG. 5, a test is initially performed during step 510 to determine if a client is authenticated using a given shared secret. Once it is determined during step 510 that a client has been authenticated using the given shared secret, the client updates the given shared secret during step 520 to generate the updated shared secret and stores the updated shared secret with the server. As used herein, the storage of the updated shared secret by the client with the server shall be broadly construed to encompass the client storing the updated shared secret with the server without participation by the server, as well as the client providing the updated shared secret to the server for storage by the server. In some embodiments, the information from the authentication used for the updated shared secret comprises a timestamp of the authentication, a random value used in the authentication, and/or a substantially unique value used in the authentication.

In one or more embodiments, the update performed during step 520 comprises an exclusive OR (XOR) operation or a hash operation applied to the given shared secret and the information from the authentication. In a further variation, the client randomly selects the updated shared secret, as the client and the authentication server do not need to compute the same updated shared secret value, so the client can just create a new secret value and store the updated shared secret with the authentication server. It is noted that, in some embodiments, the client and the server both independently update the shared secret upon a successful authentication. The secret can be updated when necessary, for example, using one or more of the following techniques:

the current shared secret is hashed with the current timestamp to create a new shared secret;

the current timestamp is passed through a key derivation function or a hash function and the result XORed with the current shared secret;

other aspects of the authentication could also be included in the secret update function, such as the domain or authentication device associated with the authentication could be hashed together with the timestamp and the previous shared secret to create a new shared secret; and if a nonce is used as part of authentication, the nonce could optionally be included in the secret update function as well.

The exemplary client-driven shared secret update process for client authentication 500 then submits the updated shared secret to the server as part of a second authentication of the client during step 530.

An attack is optionally detected by the server during step 540 when the client attempts a new authentication using a shared secret and the server determines that the shared secret was previously used for authentication. Finally, upon such a detected attack, a recovery workflow is initiated during step 550. For example, a reset workflow can be initiated to limit how long an attacker can potentially access the account of the user.

As part of the authentications of steps 510 and 530, the client can optionally communicate the timestamp of the prior authentication to the server. As noted above, the stored shared secret information 107 optionally includes each shared secret used for authentication by a user and a corresponding timestamp when a given shared secret was used. In this manner, the server can use the communicated timestamp of the prior authentication to access and evaluate the shared secret used with the prior authentication when evaluating a current authentication. Furthermore, if the channel between the client and the server is a bi-directional channel, then the server can notify the client that the authentication succeeded and that the secret state needs to be updated. On the client side, a browser extension or a password vault could be employed to make a client-side shared secret update process seamless when interacting with web sites.

It is noted that the shared secret is shared between the client and the authentication server in the sense that once the client updates the given shared secret and stores the updated shared secret with the authentication server during step 520, both the client and the authentication server have a copy of the shared secret and the shared secret is shared between them. The authentication server will use the updated shared secret as part of the next authentication attempt.

Figure 6:
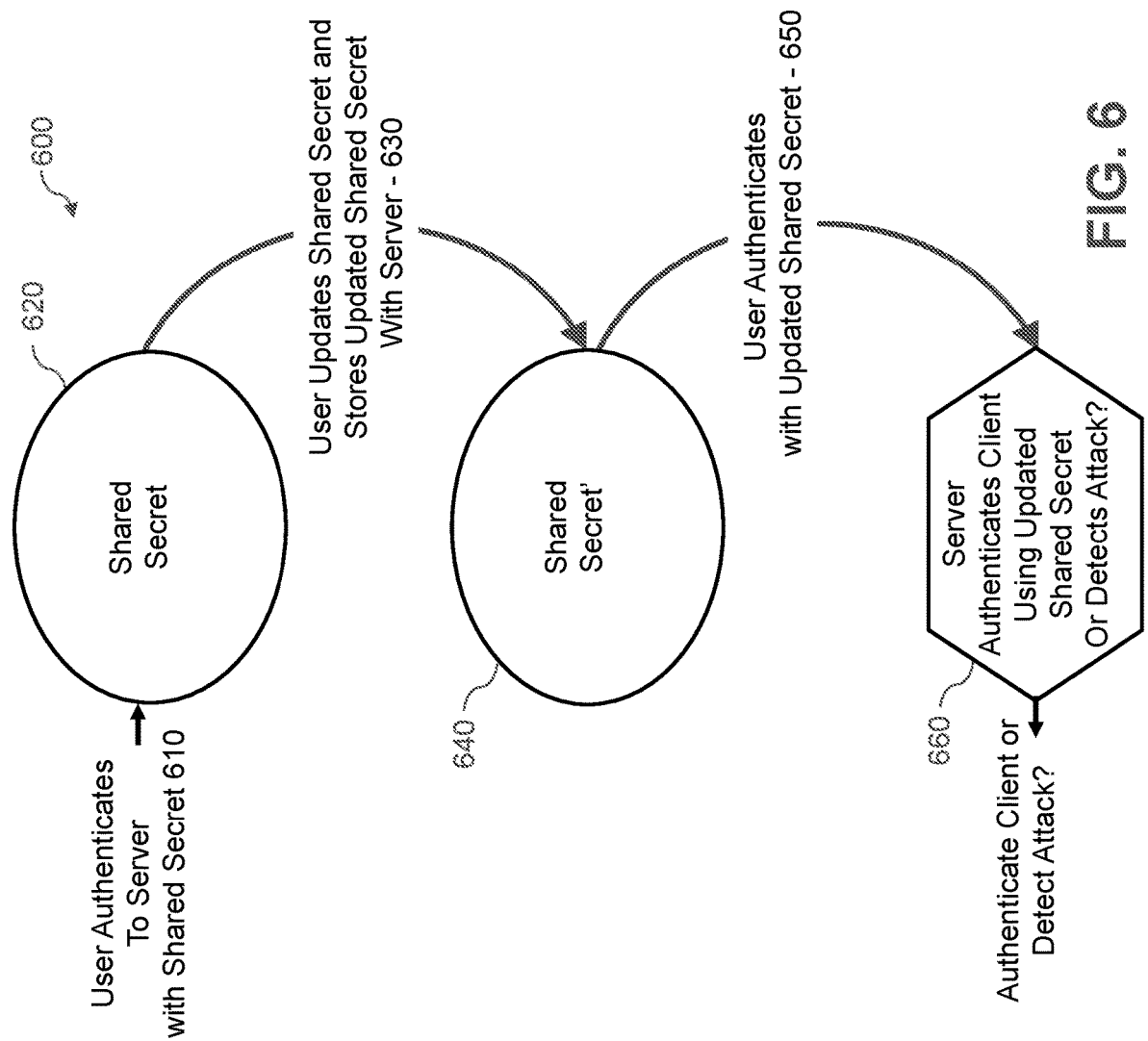
FIG. 6 illustrates a chain of shared secrets, according to an embodiment of the disclosure.

FIG. 6 illustrates a shared secret chain 600, according to one illustrative embodiment of the disclosure. As shown in FIG. 6, during step 610, a user authenticates with a shared secret 620 (Shared Secret). During step 630, the user updates the shared secret 620 to generate an updated shared secret 640 (Shared Secret') and stores the updated shared secret 640 with the server (for example, using the exemplary client-driven shared secret update process for client authentication 500 of FIG. 5). In some embodiments, the updated shared secret 640 is a function of the prior shared secret 620.

As shown in FIG. 6, during step 650, the user authenticates to the server with the updated shared secret 640 (Shared Secret'). During step 660, the server authenticates the client using the updated shared secret 640 or detects an attack.

Assume that an attacker intercepted the updated shared secret 640 (e.g., using a MI™ attack) and then authenticates with the updated secret 640 (e.g., using a hash of the password of the user) prior to step 650 at a time $t_0$. In connection with the authentication of the attacker at time $t_0$, the updated shared secret 640 is further updated to a new shared secret (e.g., Secret"). The new shared secret is a function of the updated secret 640.

The user then attempts to authenticate with the updated secret 640 (e.g., the last shared secret value known to the user) during step 650. Thus, when the real user attempts to authenticate, the authentication fails because the shared secret of the user is no longer up-to-date with the server (e.g., the updated secret 640 was already changed in connection with the attacker authentication at time $t_0$). Thus, an attack is detected at state 660.

In some embodiments, attack detection can occur in real-time in connection with the authentication, or attack detection can be deferred until a later time (e.g., every night the server could perform batch processing to analyze failed authentications, for example, depending on the number of users of the system).

The disclosed client-driven shared secret update techniques thus allow detection after-the-fact. If, during authentication, the client provides a reference to what the client believes is the previous secret (or other data that allows the server to look up the previously used shared secret), the server would be able to identify a fork in the authentication chain. A fork can be considered a deviation from an expected evolution of a secret. The server could recognize that a user submitted a valid authentication for a previously used secret, but that was invalid for the current authentication due to another client forking the chain of shared secrets 600 at a previous time. Upon detection, the server can invalidate the shared secret of the user and force a recovery workflow (e.g., a reset workflow) in order to limit how long an attacker can potentially access the account of a user. The server can also require additional authentication factors to login as part of the recovery workflow. Further, the server can optionally take additional actions as part of the recovery workflow, including notifying the user or triggering an internal protocol to investigate a possible breach.

In some embodiments, the chaining of shared secrets in the manner shown in FIG. 6 enables the server to potentially detect whether a breach has occurred, in which secrets of multiple users have been stolen. By monitoring the number of forked authentication chains across a user population, for example, the server can observe anomalies and take action. For example, if the number of detected forked authentication chains spikes to above-normal levels (e.g., based on a predefined threshold or another criteria), an internal protocol could be triggered thereby requiring all users to require step-up authentication until a possible breach can be investigated and/or resolved.

The particular processing operations and other network functionality described in conjunction with the flow diagrams of FIGS. 5 and 6 are presented by way of illustrative example only, and should not be construed as limiting the scope of the disclosure in any way. Alternative embodiments can use other types of processing operations to update a shared secret responsive to an authentication of a user. For example, the ordering of the process steps may be varied in other embodiments, or certain steps may be performed concurrently with one another rather than serially.

In one or more embodiments, the disclosed techniques for authenticating a user using client-driven shared secret updates optionally include a detection mechanism for detecting if a shared secret is used by more than one client (e.g., cloning), or if an authentication is captured and used by an attacker (e.g., Man-in-the-Middle attack). In some instances, the disclosed client-driven secret evolution techniques can be used to prevent such attacks.

Among other benefits, the disclosed techniques for authenticating a user using client-driven shared secret updates that chain successful authentications together significantly reduce the valid lifetime of a shared secret, for example, from an order of years down to an order of hours (or even less). Thus, the risk of a stolen secret is significantly reduced, since the window for authentication is much smaller (e.g., attackers can no longer indefinitely authenticate after stealing a shared secret).

One or more embodiments of the disclosure provide improved methods, apparatus and computer program products for authentication using client-driven shared secret updates. The foregoing applications and associated embodiments should be considered as illustrative only, and numerous other embodiments can be configured using the techniques disclosed herein, in a wide variety of different applications.

It should also be understood that the disclosed authentication techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for authenticating a user using client-driven shared secret updates may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based authentication engine, or portions thereof, are illustratively implemented for use by tenants of such a multi-tenant environment.

Cloud infrastructure as disclosed herein can include cloud-based systems such as Amazon Web Services (AWS), a trademark of Amazon.com, Inc., Google Cloud Platform (GCP), a trademark of Google LLC, and Microsoft Azure, a trademark of Microsoft Corporation. Virtual machines provided in such systems can be used to implement at least portions of a cloud-based authentication platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
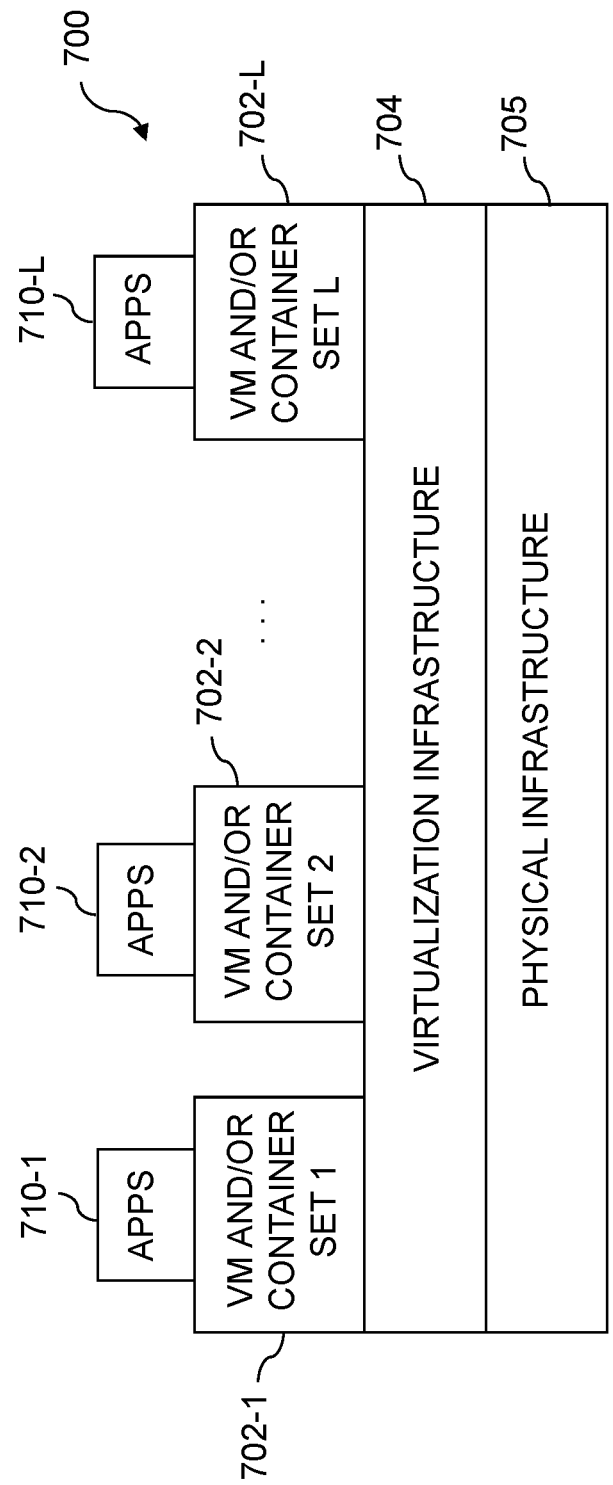
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the disclosed authentication system. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide authentication functionality of the type described above for one or more processes running on a given one of the VMs. For example, each of the VMs can implement authentication control logic and associated client-driven shared secret update techniques for providing authentication functionality for one or more processes running on that particular VM.

An example of a hypervisor platform that may be used to implement a hypervisor within the virtualization infrastructure 704 is the VMware® vSphere®, a trademark of VMware, Inc., which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide authentication functionality of the type described above for one or more processes running on different ones of the containers. For example, a container host device supporting multiple containers of one or more container sets can implement one or more instances of authentication control logic and associated client-driven shared secret update features for use in protecting shared secrets.

As is apparent from the above, one or more of the processing modules or other components of the authentication server 112 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi, a trademark of the non-profit Wi-Fi Alliance, or WiMAX, a trademark of WiMAX Forum, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
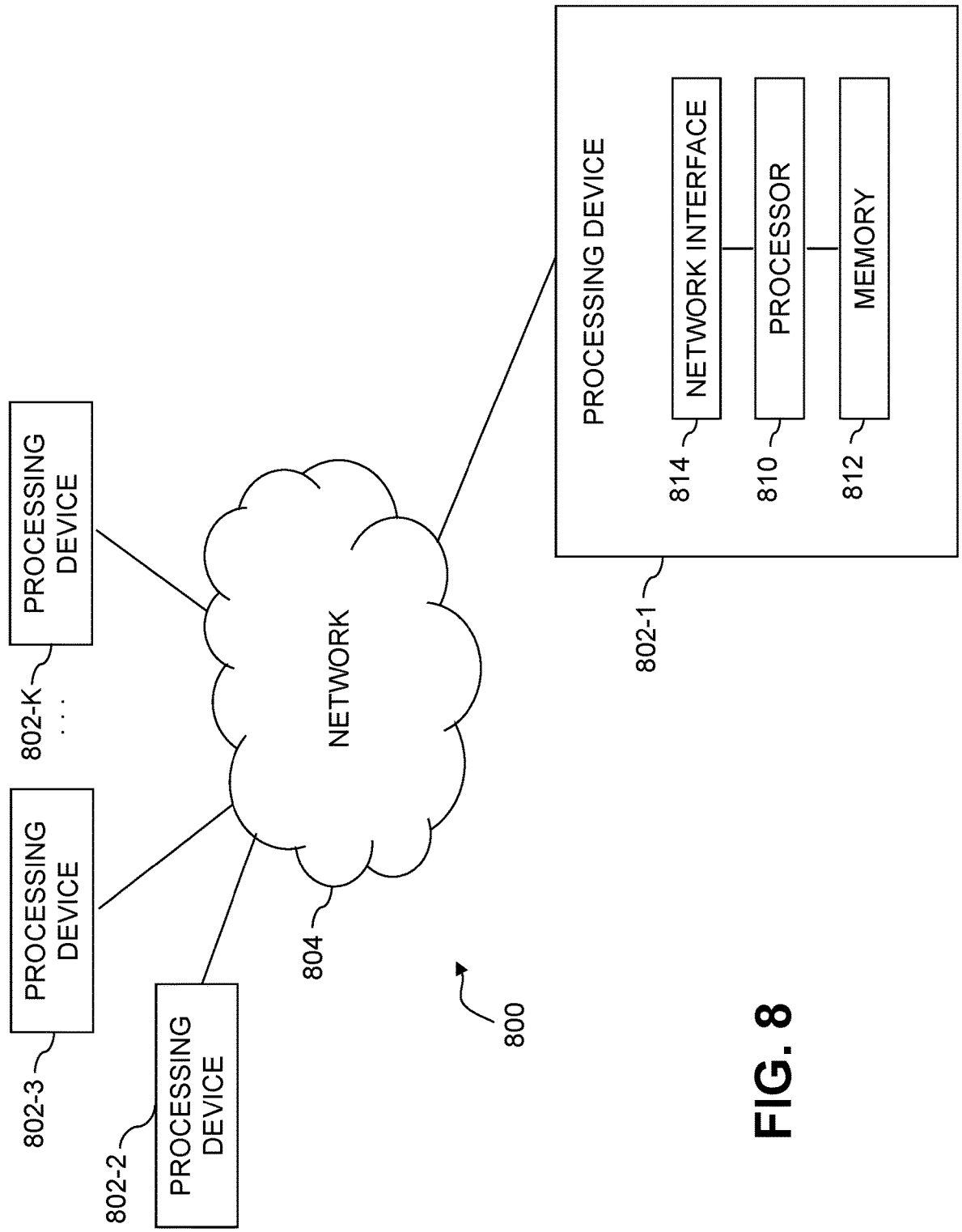
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC, a trademark of Dell Inc.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
in response to a successful first authentication of a user by a server using a given shared secret:
updating, using at least one processing device of the user, the given shared secret to generate an updated shared secret; and
initiating, using the at least one processing device of the user, a storing of the updated shared secret with the server; and
in conjunction with a second authentication attempt of the user by the server:
submitting, using the at least one processing device of the user, the updated shared secret to the server as part of the second authentication attempt of the user, wherein the first authentication and the second authentication are performed in conjunction with a request by the user to access a protected resource.

2. The method of claim 1, wherein the given shared secret is updated using information from the first authentication as part of a secret update protocol to generate the updated shared secret.

3. The method of claim 2, wherein the information from the first authentication comprises one or more of a timestamp of the first authentication, a random value used in the first authentication, and a substantially unique value used in the first authentication.

4. The method of claim 1, wherein the given shared secret comprises one or more of a password, a cryptographic key, a cryptographic symmetric key, a personal identification number, and a shared secret seed used to derive one-time passcodes.

5. The method of claim 1, wherein the updating is performed by one or more of a password vault and a browser extension.

6. The method of claim 1, wherein the server evaluates whether the at least one processing device of the user stores the updated shared secret with the server in connection with the first authentication and implements one or more predefined steps when the updated shared secret is not stored with the server.

7. The method of claim 1, wherein an anomaly is detected when the at least one processing device of the user attempts the second authentication using a particular shared secret and the server determines that the particular shared secret was previously used for an authentication.

8. The method of claim 7, wherein, in response to the anomaly being detected, the server initiates a predefined recovery workflow.

9. The method of claim 7, wherein the server detects a breach of shared secrets of multiple users by monitoring a number of said detected anomalies across a user population.

10. The method of claim 1, wherein the update comprises one or more of: (i) one or more of an exclusive OR operation and a hash operation applied to the given shared secret and information from the first authentication; and (ii) the at least one processing device of the user randomly selecting the updated shared secret.

11. The method of claim 1, wherein the at least one processing device of the user receives a notification, from the server, of one or more of that the first authentication succeeded and that the given shared secret needs to be updated.

12. The method of claim 1, wherein the initiating the storing of the updated shared secret with the server comprises one or more of: (i) the at least one processing device of the user storing the updated shared secret with the server without participation by the server and (ii) the at least one processing device of the user providing the updated shared secret to the server for storage by the server.

13. A system, comprising:
a memory; and
at least one processing device, coupled to the memory, operative to implement the following steps:
in response to a successful first authentication of a user by a server using a given shared secret:
updating, using at least one processing device of the user, the given shared secret to generate an updated shared secret; and
initiating, using the at least one processing device of the user, a storing of the updated shared secret with the server; and
in conjunction with a second authentication attempt of the user by the server:
submitting, using the at least one processing device of the user, the updated shared secret to the server as part of the second authentication attempt of the user, wherein the first authentication and the second authentication are performed in conjunction with a request by the user to access a protected resource.

14. The system of claim 13, wherein the updating is performed by one or more of a password vault and a browser extension.

15. The system of claim 13, wherein the server evaluates whether the at least one processing device of the user stores the updated shared secret with the server in connection with the first authentication and implements one or more predefined steps when the updated shared secret is not stored with the server.

16. The system of claim 13, wherein an anomaly is detected when the at least one processing device of the user attempts the second authentication using a particular shared secret and the server determines that the particular shared secret was previously used for an authentication.

17. The system of claim 13, wherein the update comprises one or more of: (i) one or more of an exclusive OR operation and a hash operation applied to the given shared secret and information from the first authentication; and (ii) the at least one processing device of the user randomly selecting the updated shared secret.

18. A computer program product, comprising a non-transitory machine-readable storage medium having encoded therein executable code of one or more software programs, wherein the one or more software programs when executed by at least one processing device perform the following steps:
in response to a successful first authentication of a user by a server using a given shared secret:
updating, using at least one processing device of the user, the given shared secret to generate an updated shared secret; and
initiating, using the at least one processing device of the user, a storing of the updated shared secret with the server; and
in conjunction with a second authentication attempt of the user by the server:
submitting, using the at least one processing device of the user, the updated shared secret to the server as part of the second authentication attempt of the user, wherein the first authentication and the second authentication are performed in conjunction with a request by the user to access a protected resource.

19. The computer program product of claim 18, wherein the server evaluates whether the at least one processing device of the user stores the updated shared secret with the server in connection with the first authentication and implements one or more predefined steps when the updated shared secret is not stored with the server.

20. The computer program product of claim 18, wherein the update comprises one or more of: (i) one or more of an exclusive OR operation and a hash operation applied to the given shared secret and the information from the first authentication; and (ii) the at least one processing device of the user randomly selecting the updated shared secret.

* * * * *